(12) United States Patent
Wang et al.

(10) Patent No.: US 7,973,897 B2
(45) Date of Patent: *Jul. 5, 2011

(54) MULTI-DOMAIN LIQUID CRYSTAL DISPLAY

(75) Inventors: Wen-Chun Wang, Tai Chung (TW);
Chin-Chang Liu, Feng Yuan (TW); I Fang Wang, Chang Hua (TW);
Ming-Chang Yu, Tai Chung (TW)

(73) Assignee: Wintek Corporation, Taichung (TW)

( * ) Notice: Subject to any disclaimer, the term of this patent is extended or adjusted under 35 U.S.C. 154(b) by 1233 days.

This patent is subject to a terminal disclaimer.

(21) Appl. No.: 11/640,205

(22) Filed: Dec. 18, 2006

(65) Prior Publication Data

US 2007/0291208 A1      Dec. 20, 2007

(30) Foreign Application Priority Data

Jun. 16, 2006   (TW) ............................... 95121677 A

(51) Int. Cl.
*G02F 1/1343* (2006.01)
(52) U.S. Cl. ........................................................ 349/139
(58) Field of Classification Search .................... None
See application file for complete search history.

(56) References Cited

U.S. PATENT DOCUMENTS

| | | | |
|---|---|---|---|
| 6,195,140 B1 | 2/2001 | Kubo et al. | |
| 6,294,876 B1 | 9/2001 | Ando et al. | |
| 6,654,090 B1 * | 11/2003 | Kim et al. | 349/129 |
| 6,678,027 B2 | 1/2004 | Park et al. | |
| 6,724,452 B1 | 4/2004 | Takeda et al. | |
| 6,839,104 B2 | 1/2005 | Taniguchi et al. | |
| 7,176,990 B2 * | 2/2007 | Choi et al. | 349/43 |
| 7,663,708 B2 * | 2/2010 | Wang et al. | 349/37 |
| 7,728,939 B2 * | 6/2010 | Tsai et al. | 349/129 |
| 2004/0041770 A1 | 3/2004 | Kubo et al. | |
| 2004/0210807 A1 | 10/2004 | Sweet et al. | |
| 2005/0046774 A1 * | 3/2005 | Choi et al. | 349/139 |
| 2005/0128399 A1 | 6/2005 | Kim et al. | |

* cited by examiner

*Primary Examiner* — Timothy Rude
(74) *Attorney, Agent, or Firm* — Muncy, Geissler, Olds & Lowe, PLLC

(57) ABSTRACT

A multi-domain liquid crystal display includes multiple first and second picture elements and multiple first and second auxiliary electrodes. The first and second picture elements have opposite polarities under the same frame of an inversion drive scheme, and each picture element has a reflective region and a transmissive region. The first auxiliary electrodes are connected to the first picture elements, and each of the first auxiliary electrodes is positioned next to at least one side of one second picture element. The second auxiliary electrodes are connected to the second picture elements, and each of the second auxiliary electrodes is positioned next to at least one side of one first picture element.

22 Claims, 20 Drawing Sheets

MULTI-DOMAIN LIQUID CRYSTAL DISPLAY

BACKGROUND OF THE INVENTION (a) Field of the Invention

The invention relates to a multi-domain liquid crystal display and, more particularly, to a multi-domain liquid crystal display having both transmissive regions and reflective regions.

(b) Description of the Related Art

Typically, the display contrast ratio and response speed offered by a vertically aligned (VA) mode liquid crystal display (LCD), which uses negative liquid crystal materials and vertical alignment films, are better than a twisted-nematic (TN) mode LCD, since liquid crystal molecules are aligned in a vertical direction when no voltage is applied. Also, it is known the viewing angle performance of a VA mode LCD is improved by setting the orientation directions of the liquid crystal molecules inside each picture element to a plurality of mutually different directions; that is, forming multiple distinct domains in the liquid crystal display.

FIG. 1A shows a schematic diagram illustrating a conventional design of a multi-domain vertically aligned liquid crystal display (MVA LCD). Referring to FIG. 1A, a top substrate 102 and a bottom substrate 104 are both provided with protrusions 106 having different inclined surfaces and covered by vertical alignment films 108. Hence, the liquid crystal molecules 112 near the inclined surfaces orientate vertically to the inclined surfaces to have different degrees of pre-tilt angles. In case the pre-tilt liquid crystal molecules exist, surrounding liquid crystal molecules 112 are tilted in the directions of the pre-tilt liquid crystal molecules 112 when a voltage is applied. Thus, multiple domains each having individual orientation direction of liquid crystal molecules 112 are formed. Besides, the domain-regulating structure for providing inclined surfaces includes, but is not limited to, the protrusions 106, and other structure such as a via structure 114 shown in FIG. 1B may also be used.

However, when one compares the optical path of light I1 and that of light I2 shown both in FIGS. 1A and 1B, it is clearly found the tilted liquid crystal molecules through which the light I2 passes under a field-off state may result in a non-zero phase difference (.nd.0) to cause light leakage. Accordingly, additional compensation films must be provided to eliminate the light leakage.

FIG. 2 shows a schematic diagram illustrating another conventional design of an MVA LCD. Referring to FIG. 2, the transparent electrode 204 on the substrate 202 is provided with slits 206. Because of the fringe fields produced at edges of transparent electrode 204 and at each slit 206, the liquid crystal molecules 208 are tilted toward the center of each slit 206 to result in a multi-domain liquid crystal (LC) cell. However, the strength of the fringe fields generated by the formation of the slits 206 is often insufficient, particularly when the widths and the intervals of the slits 206 are not optimized. Besides, since the azimuth in which the liquid crystal molecules tilt due to the fringe fields includes all directions of 360 degrees, a disclination region 210 often appears beyond the slits 206 or between two adjacent slits 206 to result in a reduced light transmittance.

Further, though the protrusion 106, via structure 114, or slit 206 may be provided to create multiple domains, the distribution of these structures in a picture element may reduce the active display area as well as the aperture ratio of the picture element.

Moreover, in a transmission type LCD device, a backlight is used to obtain a bright display independent of surrounding environments, and thus the panel brightness is often not sufficient when the device is exposed to direct sunlight. In comparison, in a reflection type LCD device, surrounding light is employed to effect a display, so that the backlight source can be omitted; however, the reflection type LCD device is largely deteriorated in visibility in a dark surrounding. Hence, there has been a strong demand for providing an optimal design of a multi-domain LCD device having both transmissive regions and reflective regions to achieve good visibility in any environment.

BRIEF SUMMARY OF THE INVENTION

Hence, an object of the invention is to provide a multi-domain liquid crystal display having both transmissive regions and reflective regions and capable of solving the problems of conventional designs Another object of the invention is to provide a multi-domain liquid crystal display having a high pixel aperture ratio.

According to the invention, the multi-domain liquid crystal display includes a plurality of first and second picture elements and a plurality of first and second auxiliary electrodes. The first and second picture elements have opposite polarities under the same frame of an inversion drive scheme, and each of the first and second picture elements has a reflective region and a transmissive region. The first auxiliary electrodes are connected to the first picture elements, and each of the first auxiliary electrodes is positioned next to at least one side of one second picture element to produce fringe fields. The second auxiliary electrodes are connected to the second picture elements, and each of the second auxiliary electrodes is positioned next to at least one side of one first picture element to produce fringe fields. The auxiliary electrodes may be made from a Metal 1 layer, a Metal 2 layer, a Metal 3 layer, or transparent conductive films.

Through the design of the invention, a multi-domain profile of a liquid crystal cell is easily formed by providing auxiliary electrodes, which are formed through typical TFT fabrication processes and have an opposite polarity in relation to adjacent pixel electrode to produce fringe fields. Hence, compared with the conventional design where a protrusion or a via structure is used to cause tilted liquid crystal molecules, the residue phase difference is eliminated to avoid light leakage since all liquid crystal molecules are vertically aligned under a field-off state. Further, compared with another conventional design where only slits are formed to produce fringe fields, the biased auxiliary electrode allows for stronger field strength to tilt liquid crystal molecules so as to reduce the area of a disclination region and thus increase the light-transmittance of a LC cell having both a transmissive region and a reflective region. In addition, according to the invention, the storage capacitor formed in each picture element overlaps with signal lines or is positioned underneath reflective electrodes to further improve the pixel aperture ratio.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
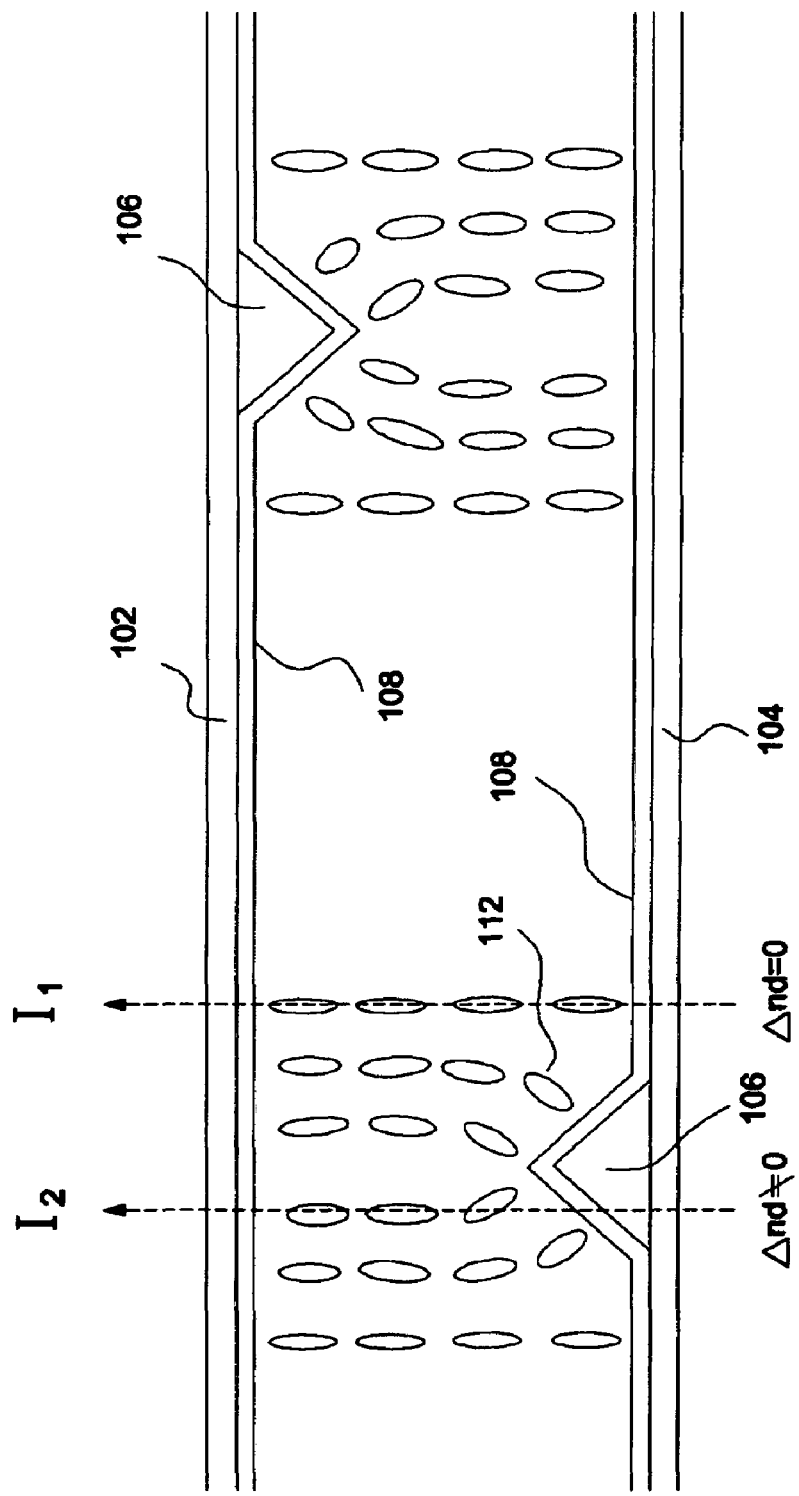
FIG. 1A shows a schematic diagram illustrating a conventional design of a multi-domain vertically aligned liquid crystal display.
Figure 1B:
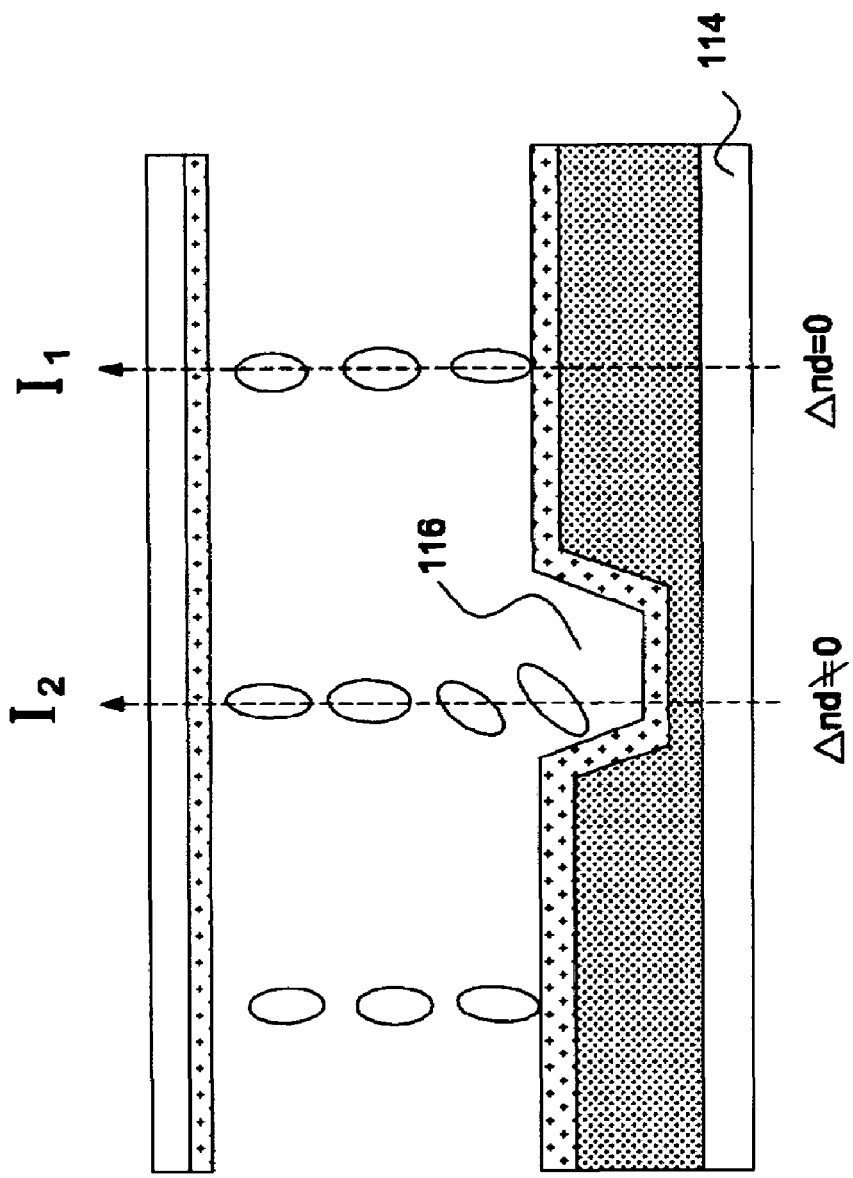
FIG. 1B shows a schematic diagram illustrating another conventional design of a multi-domain vertically aligned liquid crystal display.
Figure 2:
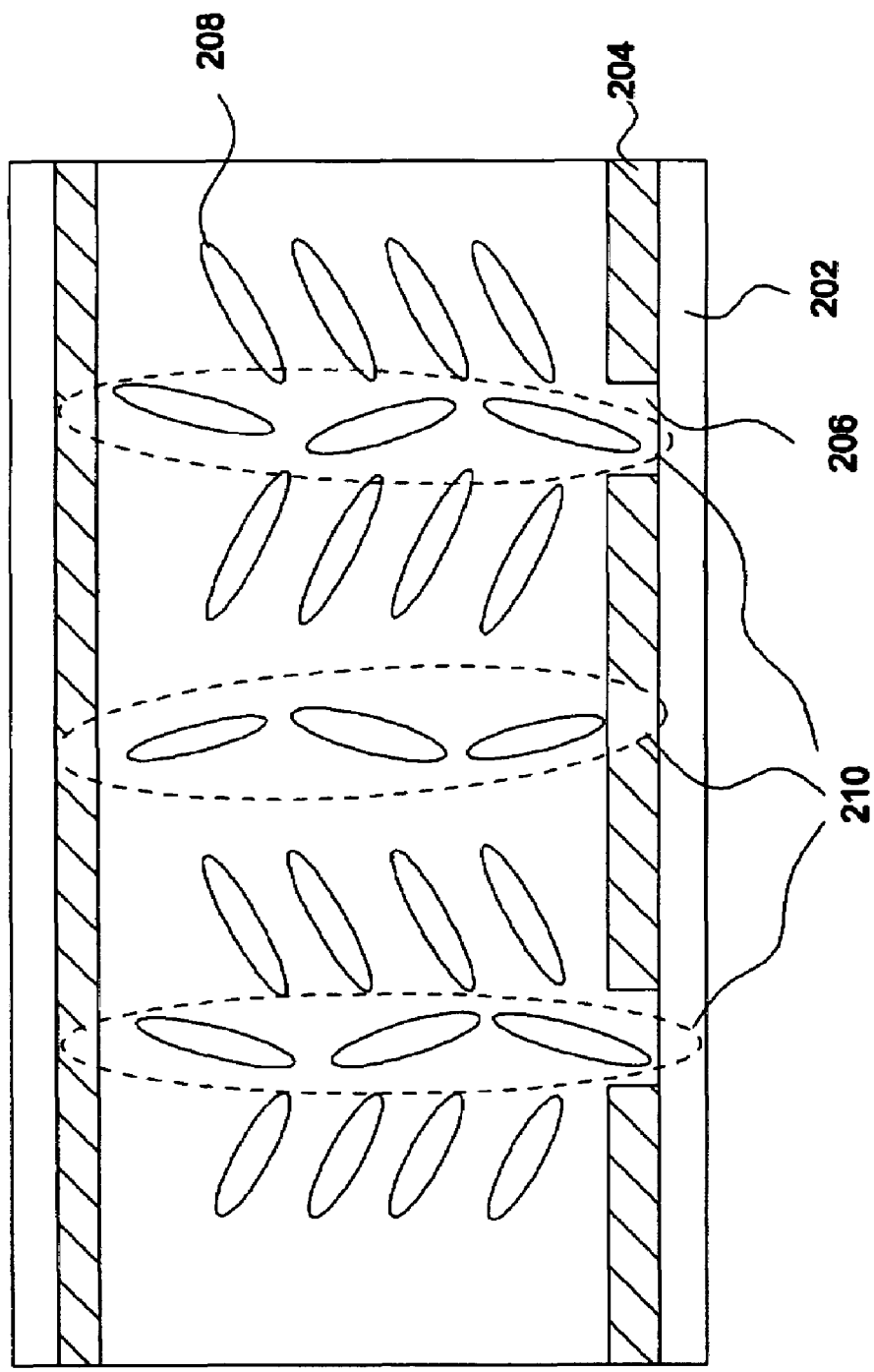
FIG. 2 shows a schematic diagram illustrating another conventional design of a multi-domain vertically aligned liquid crystal display.
Figure 3A:
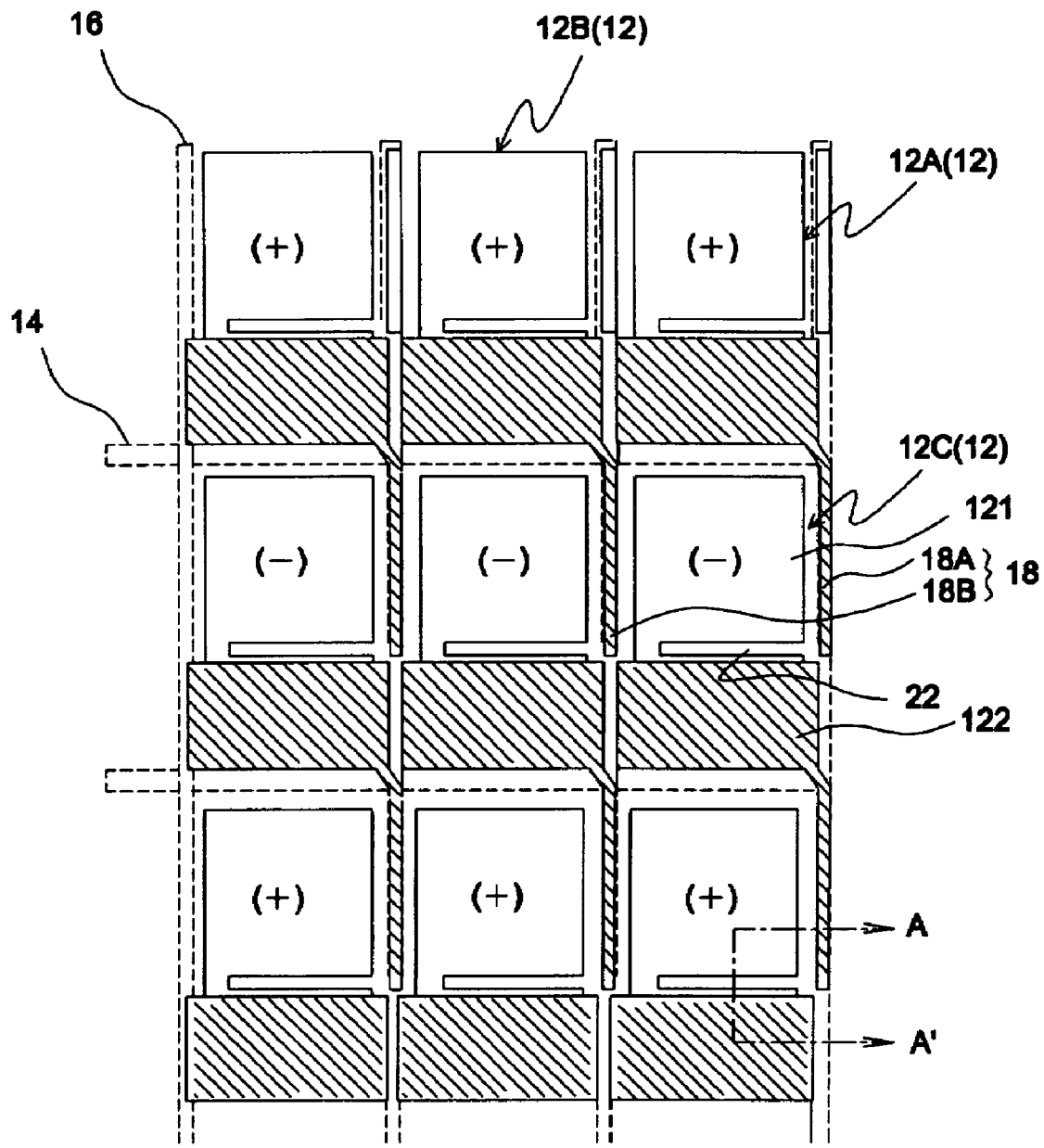
FIGS. 3A and 3B show schematic diagrams illustrating a multi-domain liquid crystal display according to an embodiment of the invention.
Figure 3B:
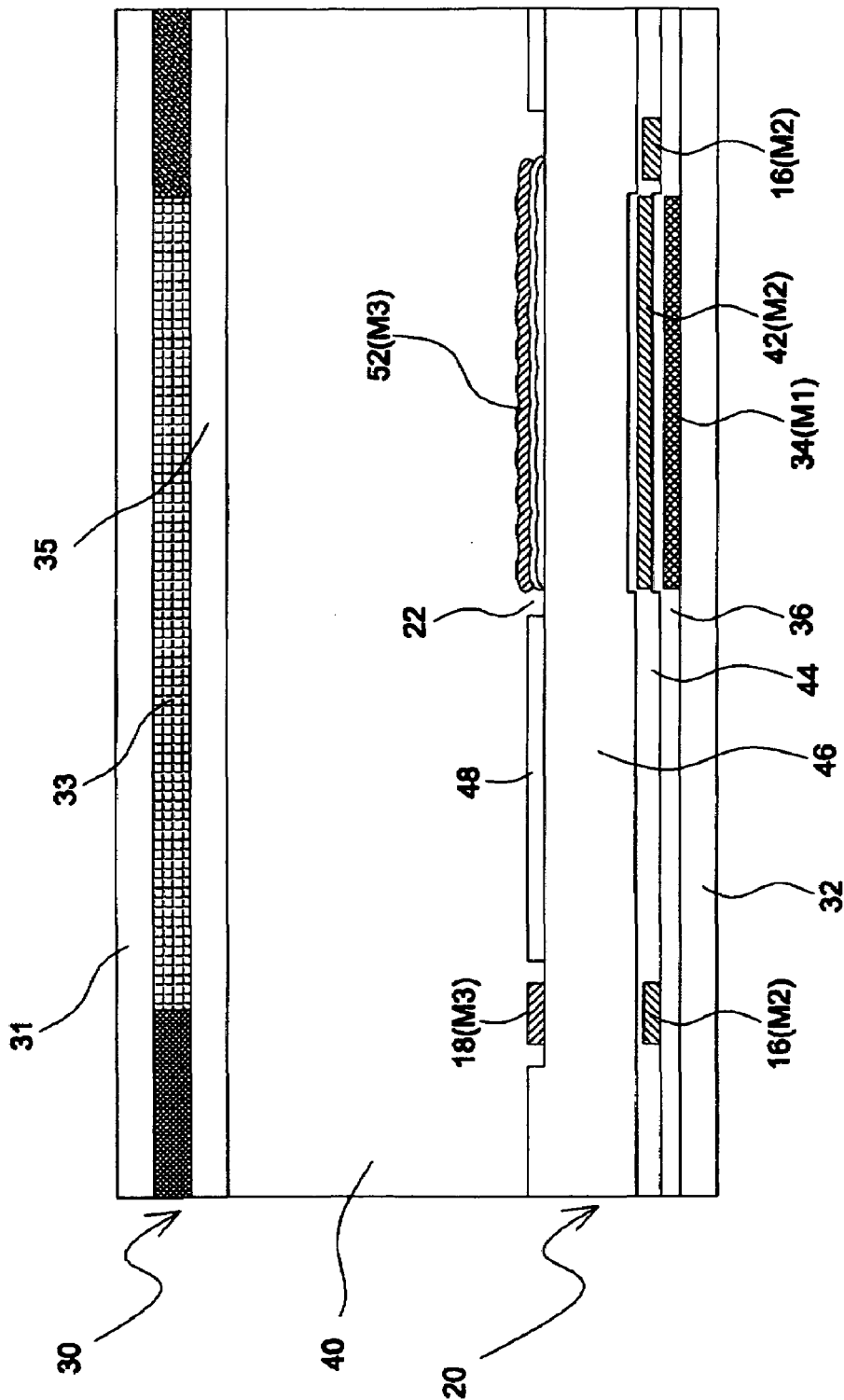

FIGS. 3A and 3B show schematic diagrams illustrating a multi-domain liquid crystal display 10 according to an embodiment of the invention, where FIG. 3A is a top view observed from the normal direction of an array substrate, and FIG. 3B is a cross-section taken along line A-A' in FIG. 3A.

Referring to FIG. 3A, a plurality of picture elements 12 that constitute the multi-domain liquid crystal play 10 are shown. Herein, the term "picture element" indicates a minimum addressable unit of a display such as a red (R), green (G), or blue (B) sub-pixel of a color liquid crystal play. A plurality of scan lines 14 are arranged extending in the horizontal direction, and a plurality of data lines 16 are arranged extending in a vertical direction, with each two scan lines 14 intersected with two data lines 16 to define a pixel area on which a picture element 12 is spread. Each picture element 12 includes a transmissive region 121 and a reflective region 122 (indicated by hatched lines) and is surrounded by an inter-pixel region that insulates adjacent picture elements from each other. Each transmissive region 121 is at least partially surrounded by an auxiliary electrode 18 and a slit 22 to produce fringe fields.

According to the polarity pattern shown in FIG. 3A, under a row inversion drive scheme, the picture elements 12A and 12B have a positive polarity and the picture element 12C has a negative polarity. An auxiliary electrode section 18A that is connected with the picture element 12A to have a positive polarity is placed in the inter-pixel region on the right side of the transmissive region 121 of the picture element 12C. Further, an auxiliary electrode section 18B that is connected with the picture element 12B to have a positive polarity is placed in the inter-pixel region on the left side of the transmissive region 121 of the picture element 12C. Hence, a voltage difference exists between the picture element 12C with a negative polarity and the surrounding auxiliary electrode sections 18A and 18B with a positive polarity to produce fringe fields, and the liquid crystal molecules with negative dielectric anisotropy are directed to a direction perpendicular to the slant electric fields. Under the circumstance, the orientations of liquid crystal molecules within one picture element are divided into different tilt directions. Besides, since the voltage difference also exists between the picture element 12C (negative polarity) and the picture element 12A (positive polarity) and a horizontally extending silt 22 is additionally provided in the bottom side of the transmissive region 121 to produce fringe fields, the resultant effect may create a four-domain profile of an LC cell.

FIG. 3B clearly illustrates the laminates in the transmissive region and in the reflective region according to an embodiment of the invention. The multi-domain liquid crystal display 10 includes an array substrate 20 and a color filter substrate 30, with a liquid crystal layer 40 having negative dielectric anisotropy interposed between them where the liquid crystal molecules are vertically aligned without being applied with a voltage. Further, an additive of chiral dopant may be added to the liquid crystal layer 40 to adjust the twist pitch to a desired value so as to reduce the area of a disclination region. In the color filter substrate 30, a color filter 33 and a common electrode 35 are formed on a transparent substrate 31. In the array substrate 20, a Metal 1 layer M1 is deposited on a transparent substrate 32 and patterned to define common lines 34 that are electrically connected to the common electrode 35. A dielectric gate insulation layer 36 is formed on the transparent substrate 32 and covers the Metal 1 layer M1. A Metal 2 layer M2 is deposited on the gate insulation layer 36 and patterned to define data lines 16 and capacitor electrodes 42. A dielectric passivation layer 44 and a flattened layer 46 are sequentially formed on the gate insulation layer 36 and cover the Metal 2 layer M2. A transparent conductive film and a Metal 3 layer M3 are deposited on the flattened layer 46. The transparent conductive film is patterned to define pixel electrodes 48, and the Metal 3 layer M3 is patterned to define auxiliary electrodes 18 that are positioned next to each pixel electrode 48 to produce fringe fields and patterned to define reflective electrodes 52, with each reflective electrode 52 being spread on part of a pixel area to constitute the reflective region of a picture element. In this embodiment, the common lines 34 made from the Metal 1 layer M1 and the capacitor electrodes 42 made from the Metal 2 layer M2 are overlapped and insulated from each other by the gate insulation layer 36 to form storage capacitors. Further, the common lines 34 and capacitor electrodes 42 on the transparent substrate 32 are both positioned underneath the reflective electrodes 52 to further improve the pixel aperture ratio. Besides, in this embodiment, the formation level of the pixel electrodes 48 are raised due to the flattened layer 46 to allow for more spread areas and thus to improve the pixel aperture ratio. Each pixel electrode 48 and surrounding auxiliary electrodes 18 have opposite polarities to produce fringe fields, and the slit 22 provided between the pixel electrode 48 (transmissive region) and the reflective electrode 52 (reflective region) also induces fringe fields.

Figure 4A:
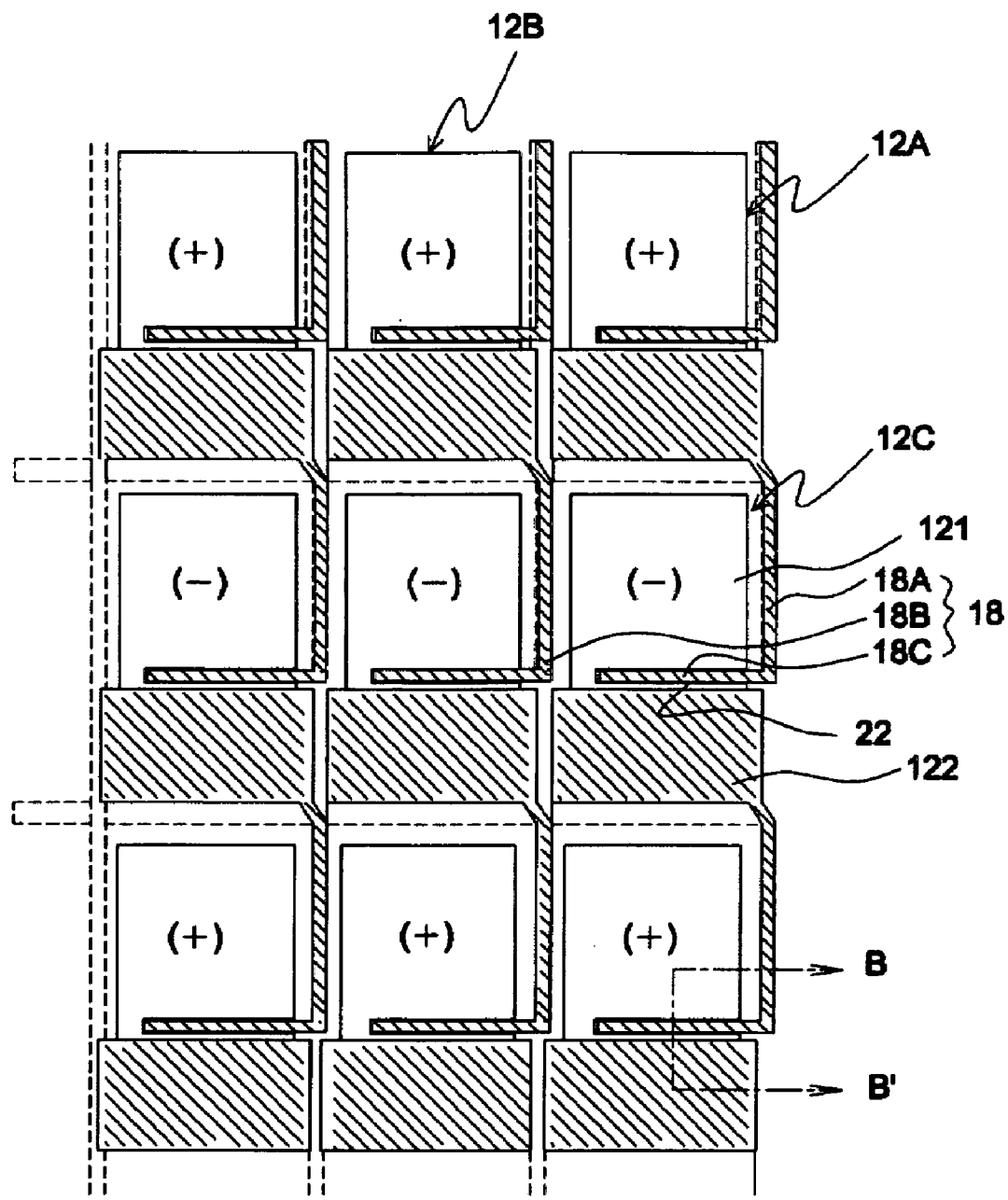
FIGS. 4A and 4B show schematic diagrams illustrating another embodiment of the invention.
Figure 4B:
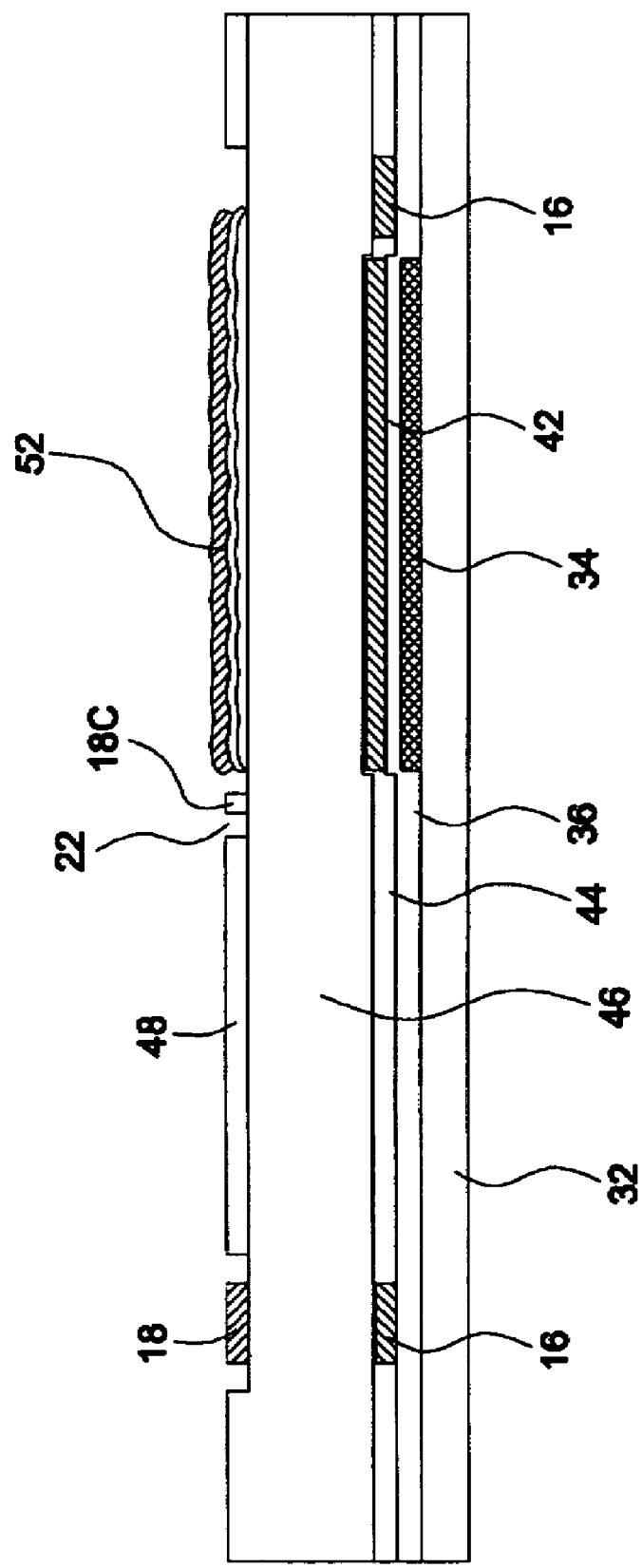

FIGS. 4A and 4B show schematic diagrams illustrating another embodiment of the invention. FIG. 4A is a top view observed from the normal direction of an array substrate, and FIG. 4B is a cross-section taken along line B-B' in FIG. 4A where only the array substrate is shown for simplification. Referring to FIGS. 4A and 4B, the auxiliary electrode 18 has an additional branch (auxiliary electrode section 18C) extending into the slit 22 to further enhance the field strength used to tilt liquid crystal molecules. In that case, auxiliary electrode sections 18A and 18C connected with the same picture element 12A are positioned next to two adjacent sides of the transmissive region 121, and auxiliary electrode section 18B connected with another picture element 12B is positioned next to another side of the transmissive region 121.

According to the above embodiments, a multi-domain profile of a LC cell is easily formed by providing auxiliary electrodes 18, which are formed through typical TFT fabrication processes and have an opposite polarity in relation to adjacent pixel electrode 48 to produce fringe fields. Hence, compared with the conventional design where a protrusion or via structure is used to cause tilted liquid crystal molecules, the residue phase difference is eliminated to avoid light leakage since all liquid crystal molecules are vertically aligned under a field-off state. Further, compared with another conventional design where only slits are formed to produce fringe fields, the biased auxiliary electrode allows for stronger field strength to tilt liquid crystal molecules so as to reduce the area of a disclination region and thus increase the light-transmittance of a LC cell having both a transmissive region and a reflective region. In addition, the common lines 34 and the capacitor electrodes 42 that together form storage capacitors are both positioned underneath the reflective electrodes 52 to further improve the pixel aperture ratio.

Figure 5:
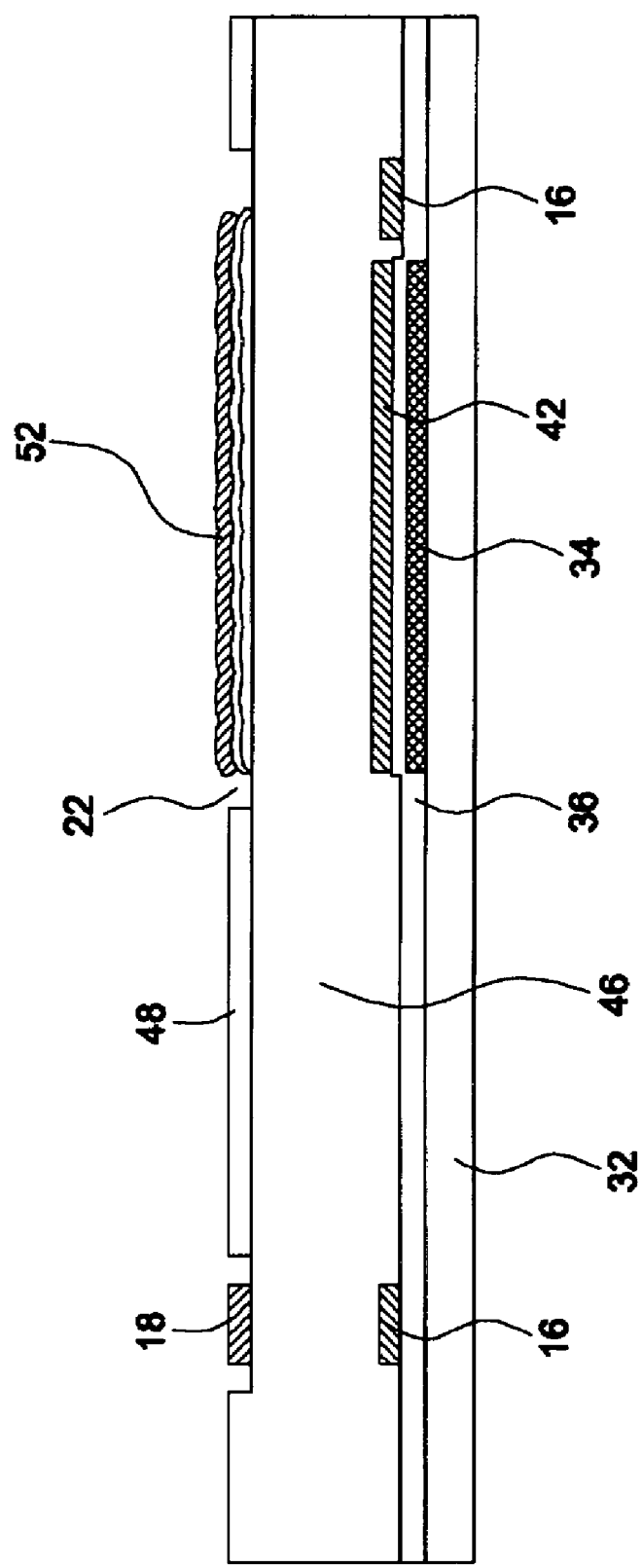
FIG. 5 shows a cross-sectional view of an array substrate illustrating another embodiment of the invention.
Figure 6:
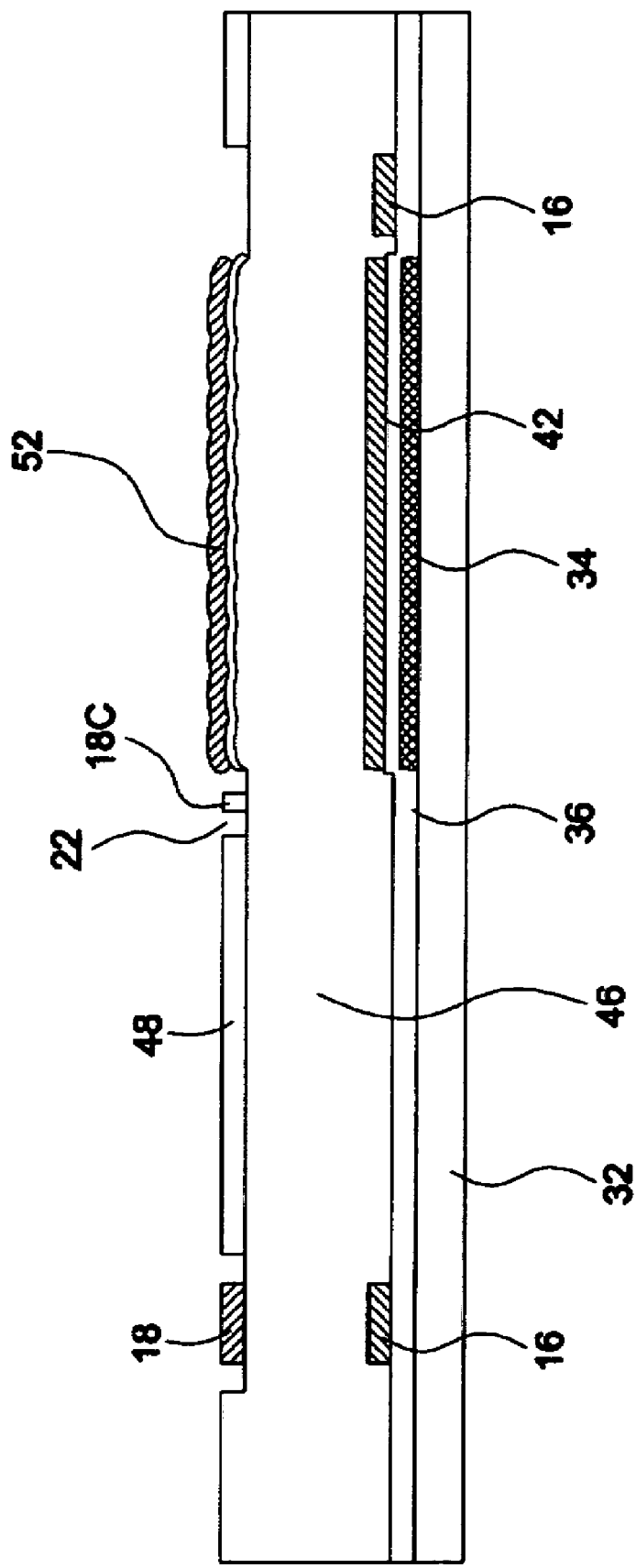
FIG. 6 shows a cross-sectional view of an array substrate illustrating another embodiment of the invention.

FIG. 5 shows a cross-sectional view of an array substrate illustrating another embodiment of the invention. As shown in FIG. 5, only the flattened layer 46 is formed overlaying the Metal 2 layer M2 before the formation of the pixel electrodes 48 and the reflective electrodes 52; that is, the passivation layer 44 shown in 3B is omitted. Further, according to the design where the passivation layer 44 is omitted, the auxiliary electrode 18 may also have a branch (auxiliary electrode section 18C) extending into the slit 22 to further enhance the field strength used to tilt liquid crystal molecules, as shown in FIG. 6.

Figure 7:
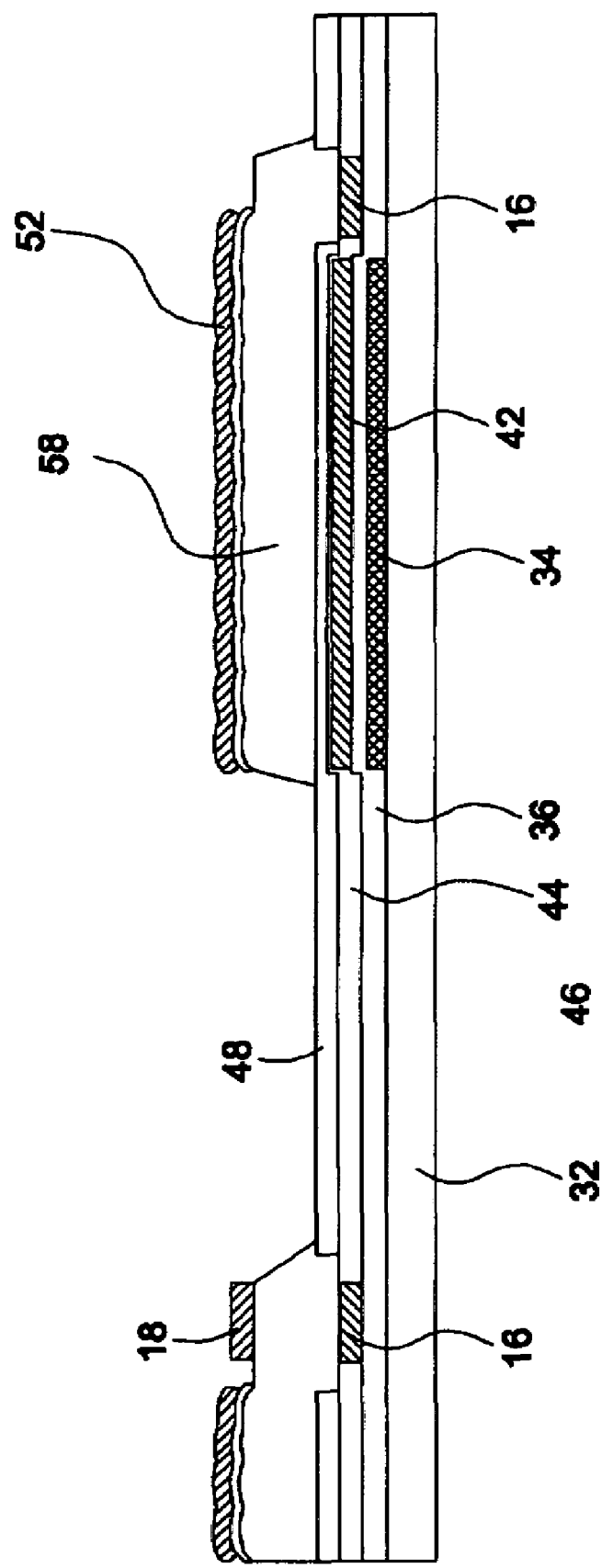
FIG. 7 shows a cross-sectional view of an array substrate illustrating another embodiment of the invention.

FIG. 7 shows a cross-sectional view of an array substrate illustrating another embodiment of the invention. As shown in FIG. 7, a passivation layer 44 is formed on the gate insulation layer 36 and covers the data lines 16 and capacitor electrodes 42, and, after pixel electrodes 48 are formed on the passivation layer 44, a dielectric spacer layer 58 is formed overlaying part of each pixel electrode 48. Then, reflective electrodes 52 are formed only on the dielectric spacer layer 58 to obtain a dual cell gap liquid crystal cell.

Figure 8:
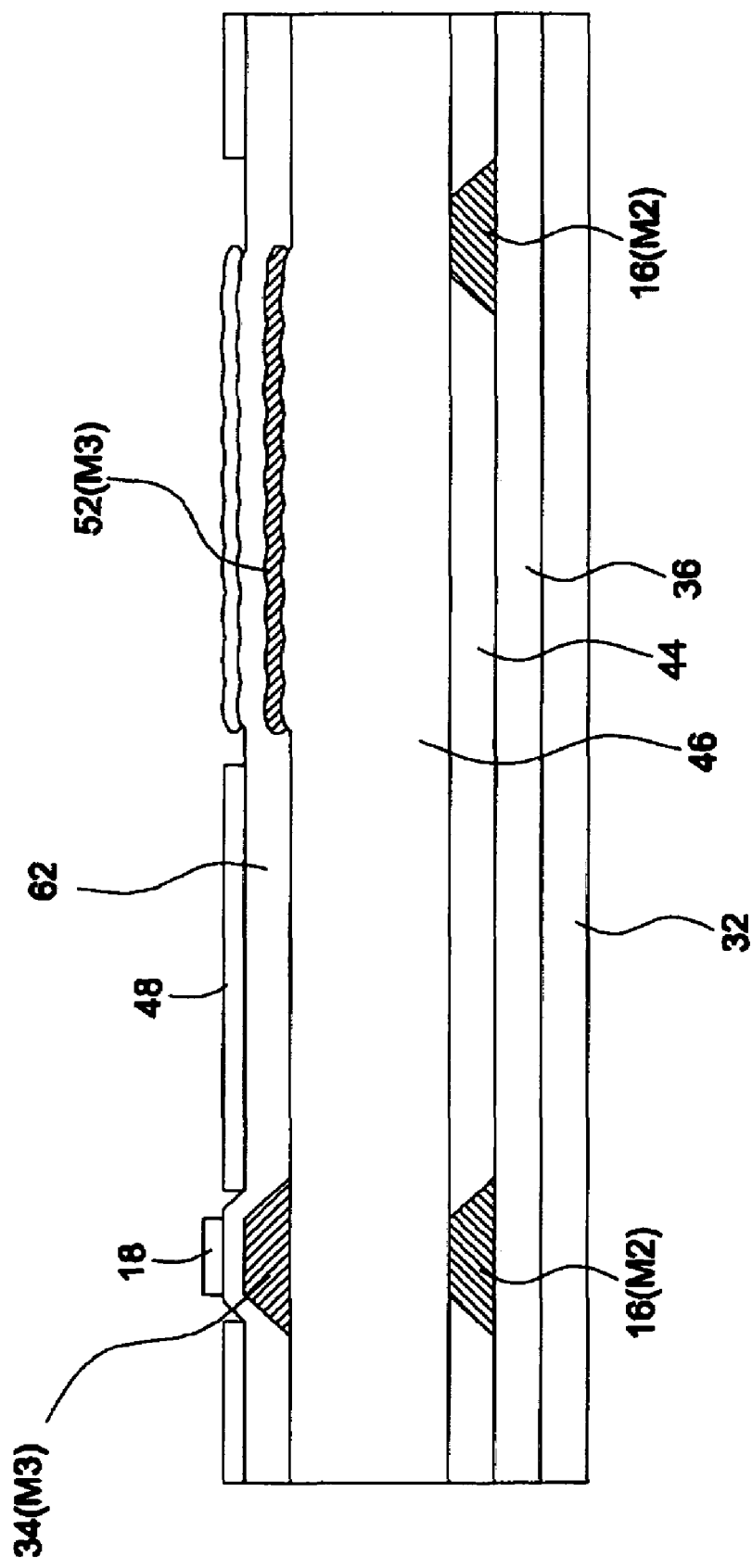
FIG. 8 shows a cross-sectional view of an array substrate illustrating another embodiment of the invention.

FIG. 8 shows a cross-sectional view of an array substrate illustrating another embodiment of the invention. Referring to FIG. 8, a dielectric gate insulation layer 36 is formed on a transparent substrate 32, and a Metal 2 layer M2 is deposited on the gate insulation layer 36 and patterned to define data lines 16. A dielectric passivation layer 44 and a flattened layer 46 are sequentially formed on the gate insulation layer 36 and cover the Metal 2 layer M2. A Metal 3 layer M3 is deposited on the flattened layer 46 and patterned to define common lines 34 and reflective electrodes 52. A dielectric layer 62 are formed overlaying the common lines 34 and the reflective electrodes 52, and pixel electrodes 48 and auxiliary electrodes 18 made from transparent conductive films are formed on the dielectric layer 62. The common lines 34 and the auxiliary electrodes 18 are overlapped and insulated from each other by the dielectric layer 62 to form storage capacitors. Further, the common lines 34 also overlap the date lines 16 to further improve the pixel aperture ratio.

Figure 9:
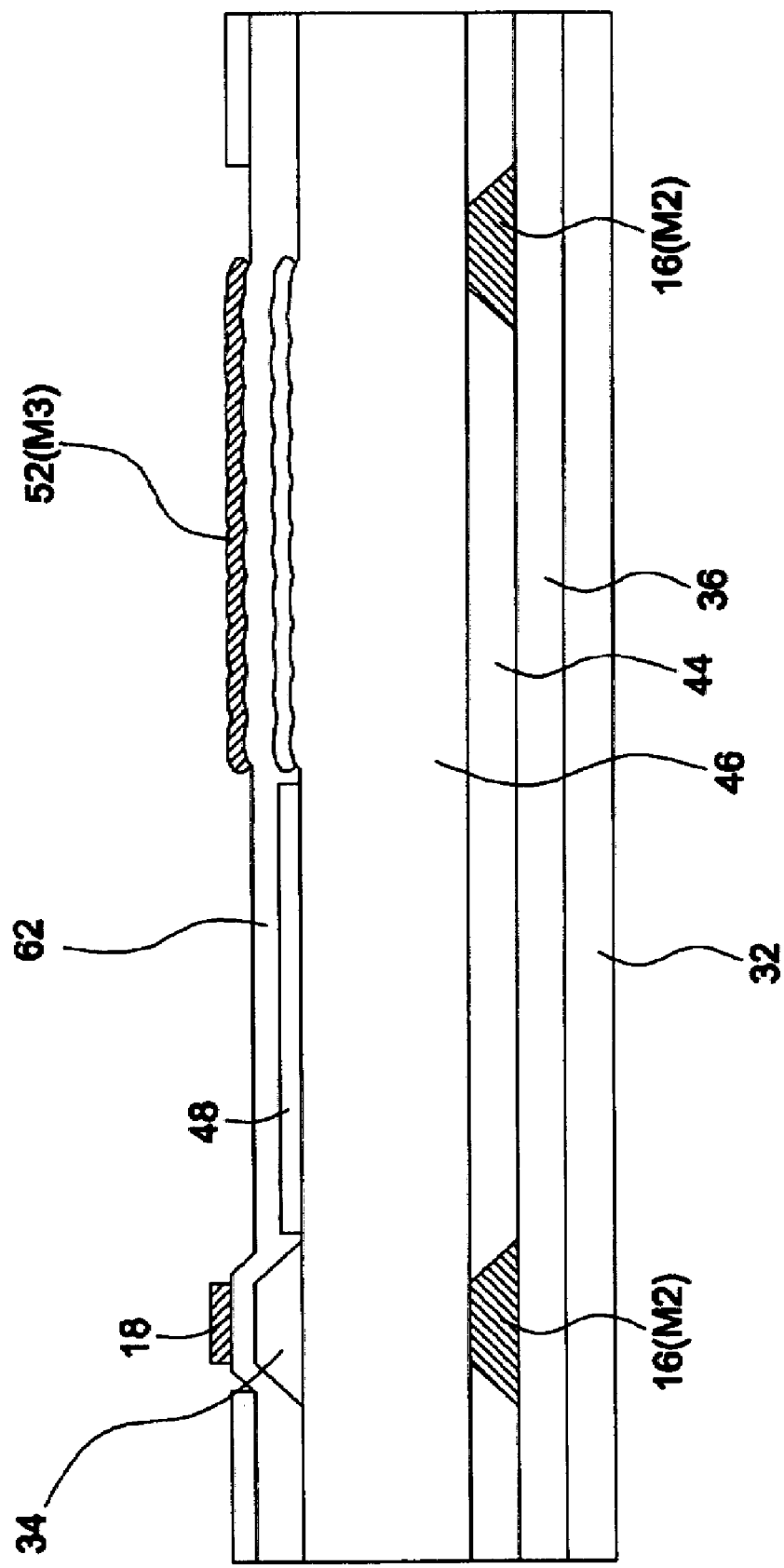
FIG. 9 shows a cross-sectional view of an array substrate illustrating another embodiment of the invention.

FIG. 9 shows a cross-sectional view of an array substrate illustrating another embodiment of the invention. Referring to FIG. 9, a dielectric layer 62 are formed overlaying common lines 34 and pixel electrodes 48, and reflective electrodes 52 and auxiliary electrodes 18 made from a Metal 3 layer M3 are formed on the dielectric layer 62. In this embodiment, the common lines 34 are made from transparent conductive films and overlap the auxiliary electrodes 18 to form storage capacitors. Further, the common lines 34 also overlap the date lines 16 to further improve the pixel aperture ratio.

Figure 10:
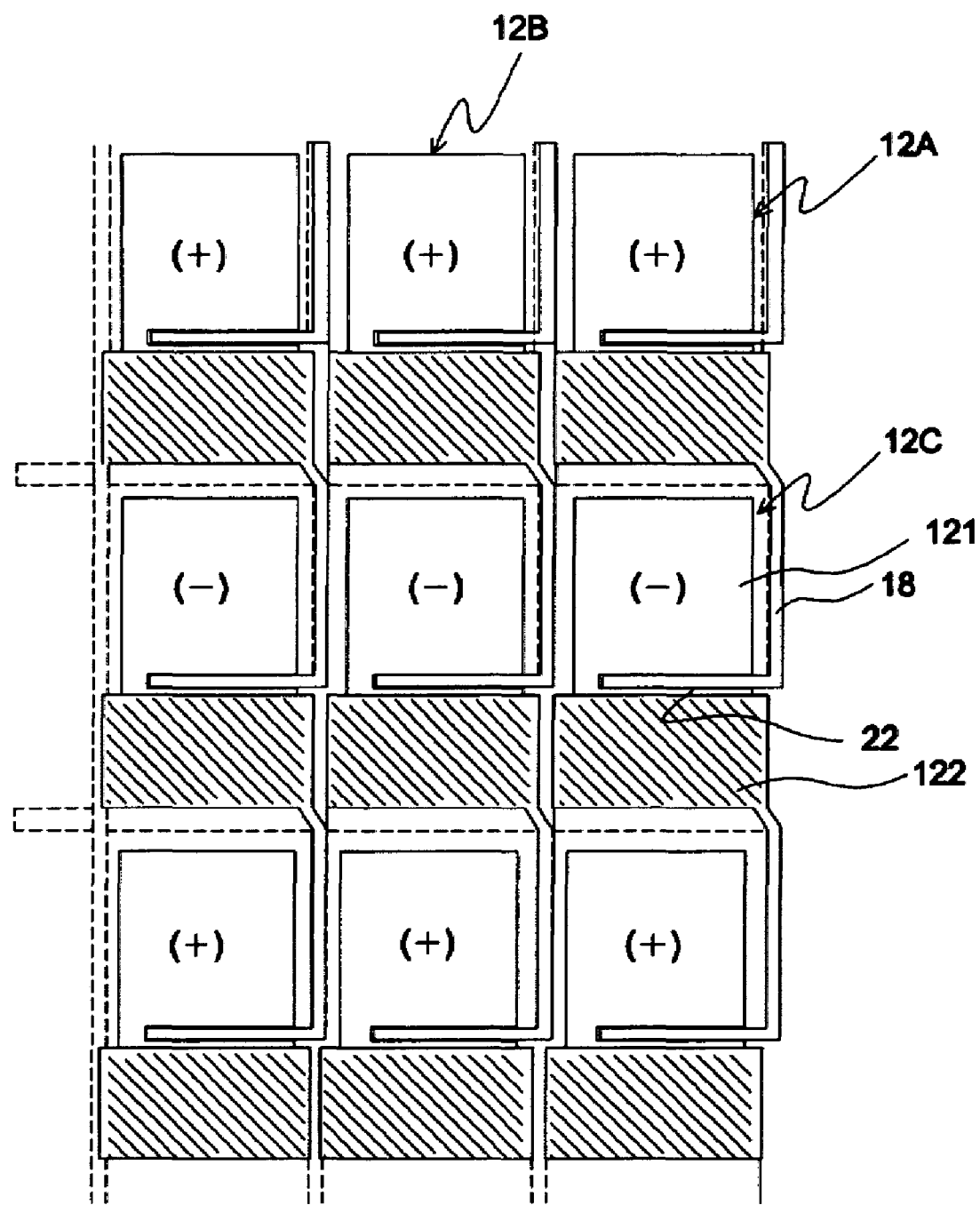
FIG. 10 shows a plan view illustrating another embodiment of the invention.
Figure 11:
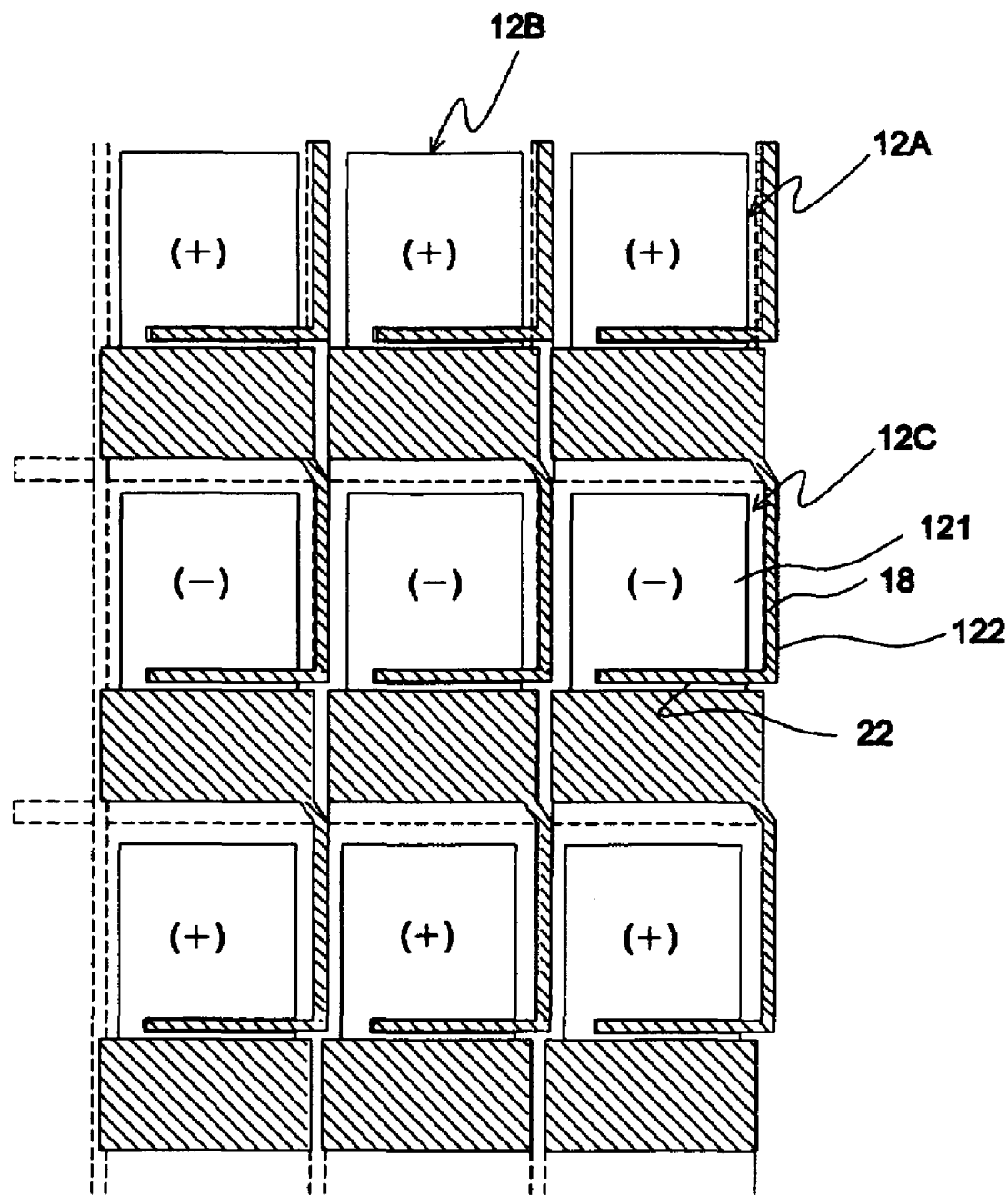
FIG. 11 shows a plan view illustrating another embodiment of the invention.
Figure 12:
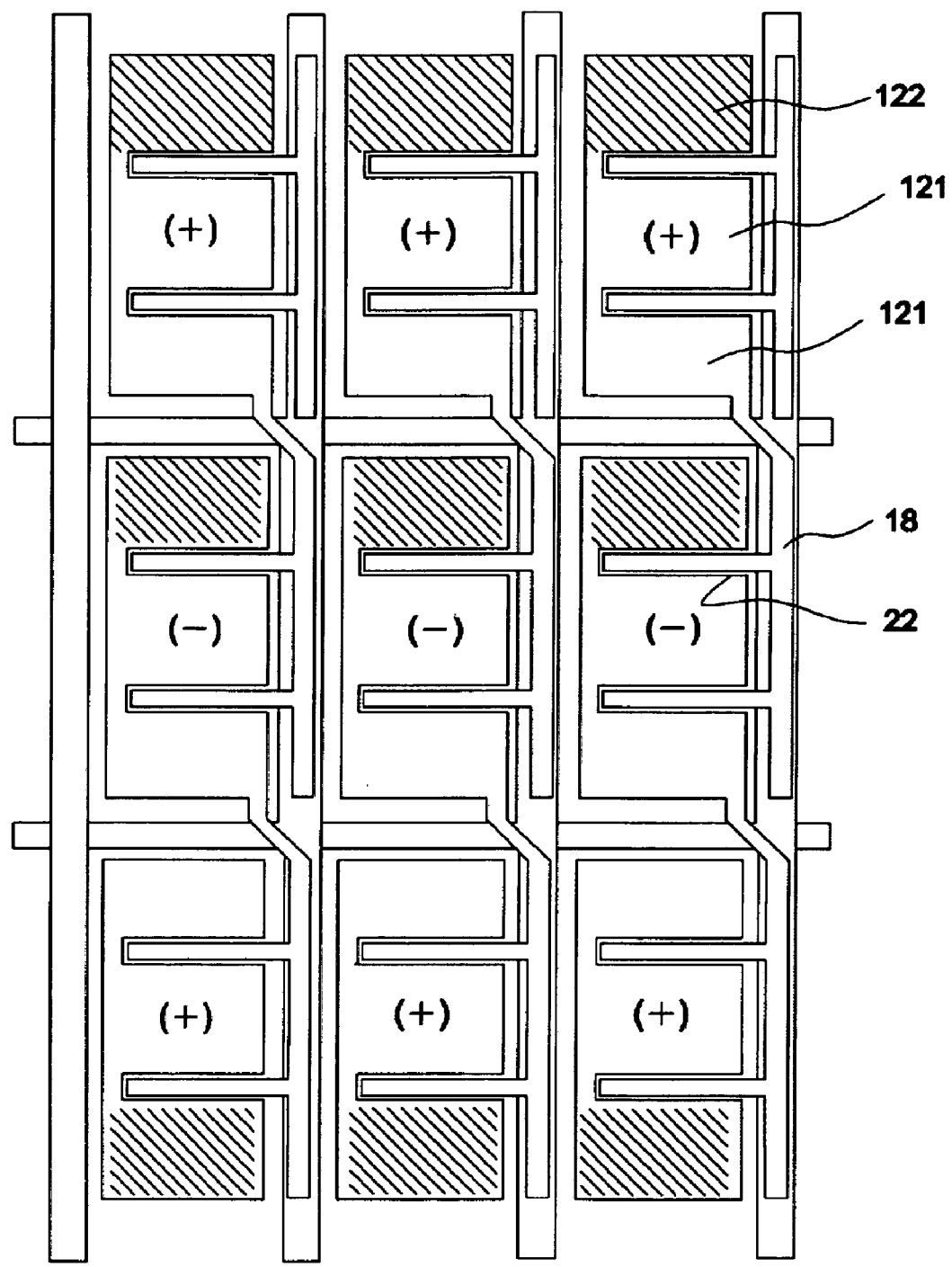
FIGS. 12 to 15 shows plan views illustrating the design of separating a picture element into multiple sub picture elements according to another embodiments of the invention.
Figure 13:
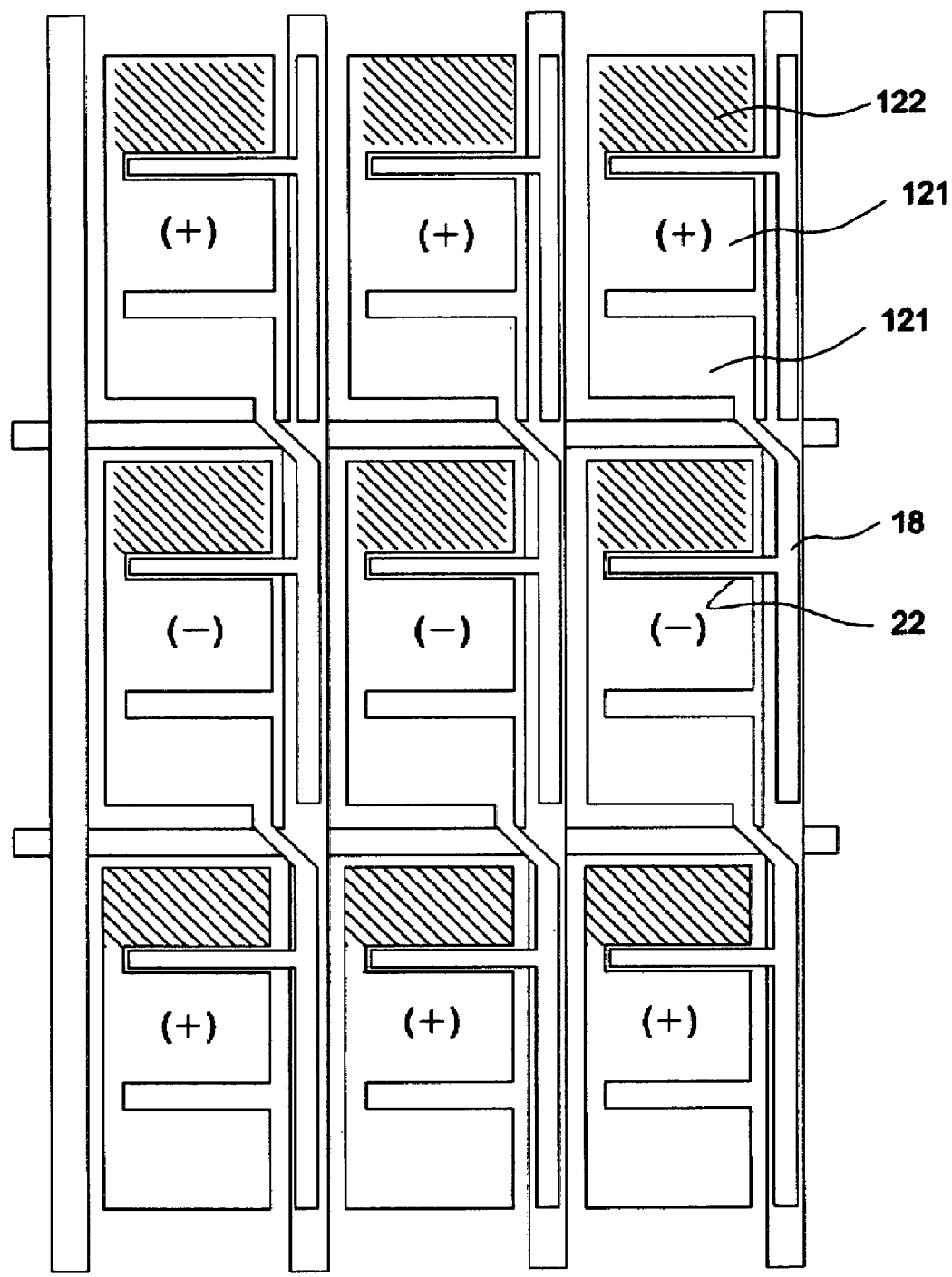
Figure 14:
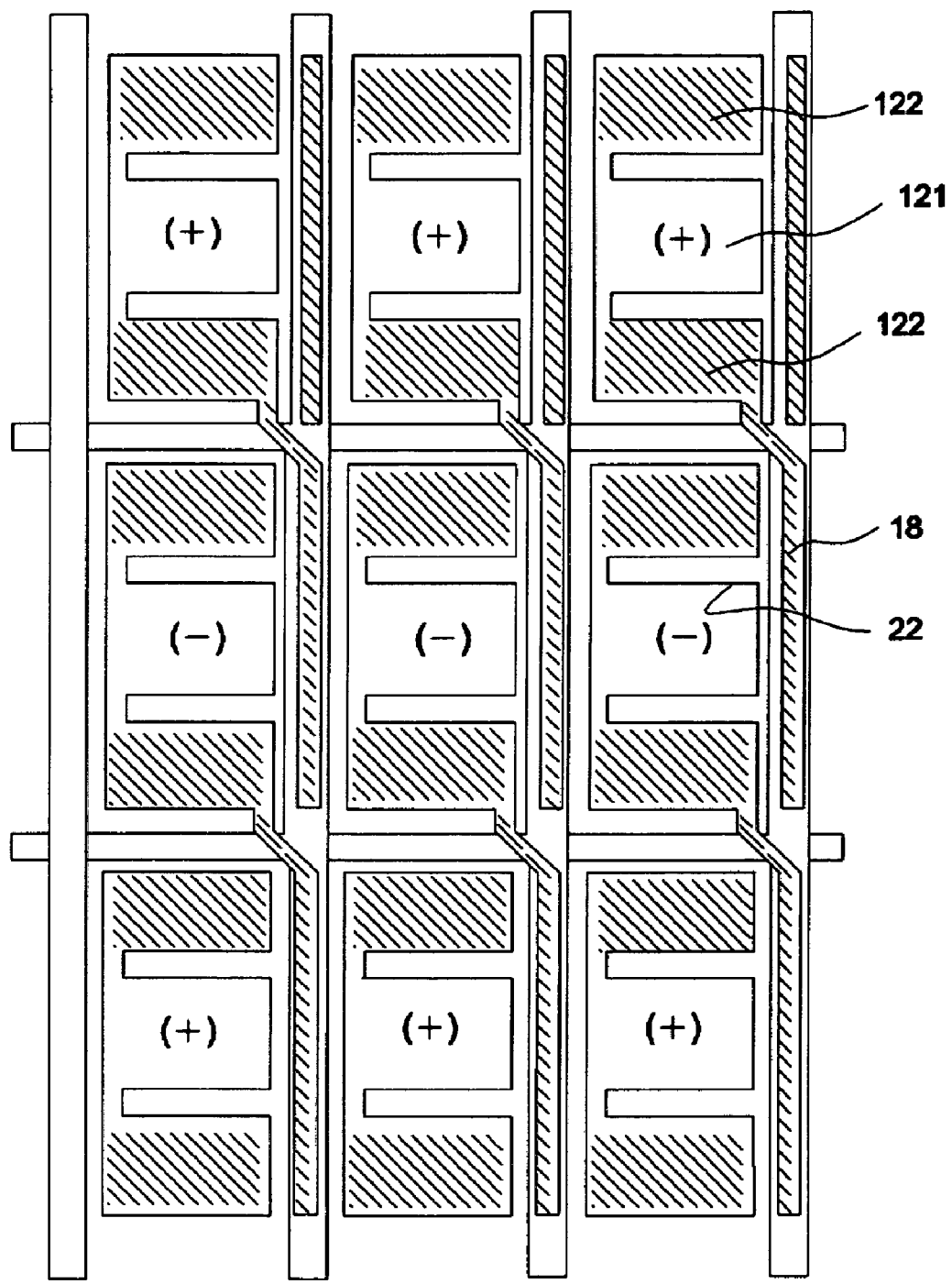
Figure 15:
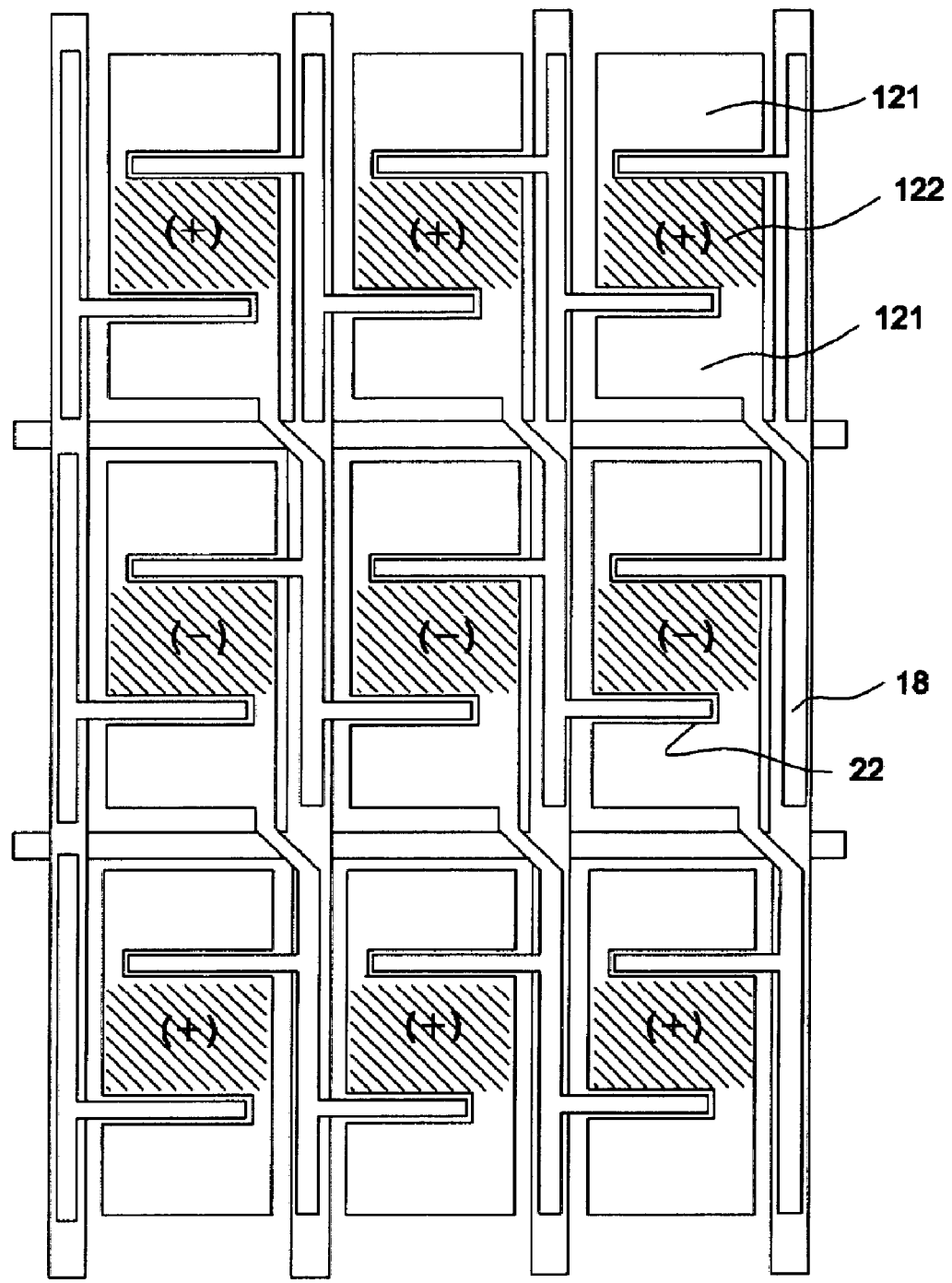

According to the invention, the area and distribution of the reflective region of a picture element can be arbitrary selected according to the actual demand. Further, the reflective electrodes 52 are not limited to be made from the Metal 3 layer as exemplified in the above embodiments. The reflective electrodes 52 may also be made from the Metal 1 layer or Metal 2 layer, as long as the function of reflecting sufficient surrounding light is maintained. Besides, the auxiliary electrodes 18 may be transparent electrodes, as shown in FIG. 10, or reflective electrodes, as shown in FIG. 11.

FIGS. 12 to 15 shows plan views illustrating the design of separating a picture element into multiple sub picture elements according to another embodiments of the invention. As shown in FIGS. 12 to 15, it can be seen each picture element is divided into multiple sub picture elements by slits 22 provided on electrodes, and the auxiliary electrodes 18 may extend into the slit 22 to enhance the field strength or not. Besides, each sub picture element can be arbitrary selected as either the transmissive region or the reflective region, and the distribution of the auxiliary electrodes 18 and the slits 22 can be modified as long as sufficient field strength is provided. Further, in FIGS. 12 to 15, each picture element is exemplified as divided into three sub picture element; however, this is not limited and the division number can be arbitrary selected according to the actual demand.

Figure 16:
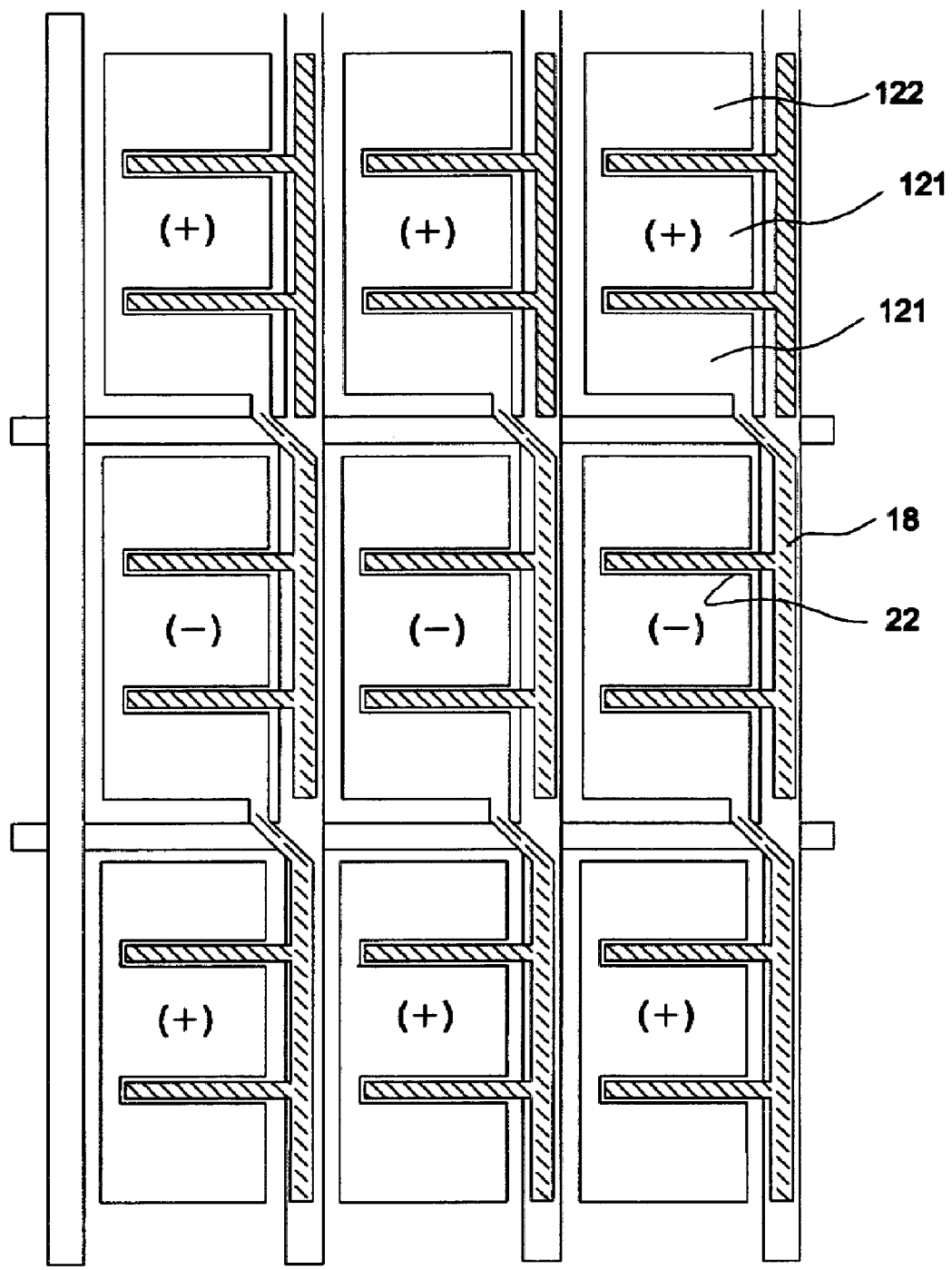
FIG. 16 shows a plan view illustrating another embodiment of the invention.

FIG. 16 shows a plan view illustrating another embodiment of the invention. In this embodiment, the auxiliary electrodes 18 that extend into the slits 22 are made from metallic films or made from transparent conductive films but covered with a metallic film to function as a reflecting plate used in a micro-reflective liquid crystal display.

Figure 17:
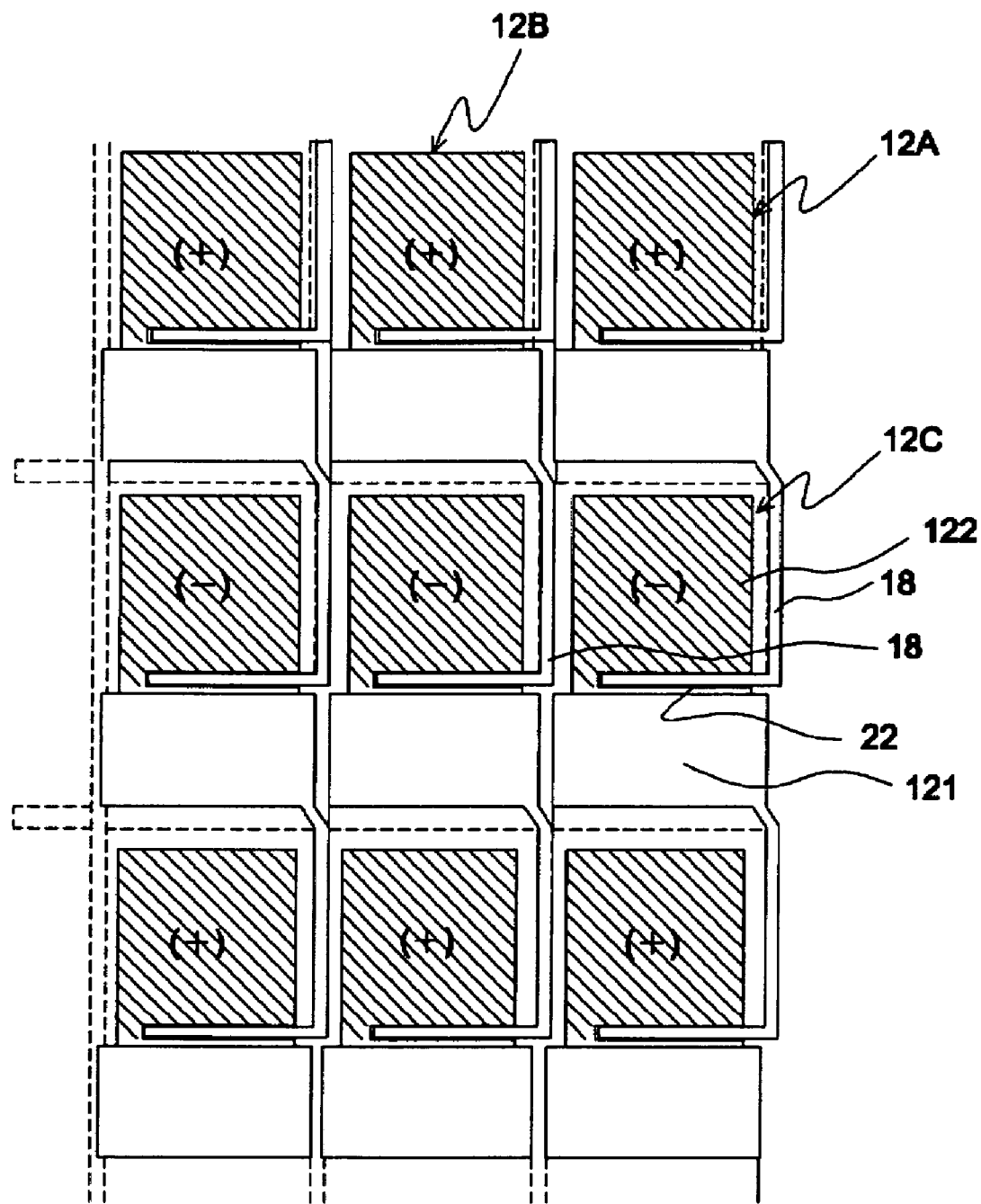
FIG. 17 shows a plan view illustrating another embodiment of the invention.

FIG. 17 shows a plan view illustrating another embodiment of the invention. In this embodiment, each reflective region is at least partially surrounded by the auxiliary electrodes. For example, the reflective region 122 of the picture element 12C is surrounded by the auxiliary electrodes 18 that are connected with different picture elements 12A and 12B having a positive polarity to create multiple LC domains in the reflective region 122.

While the invention has been described by way of examples and in terms of the preferred embodiments, it is to be understood that the invention is not limited to the disclosed embodiments. On the contrary, it is intended to cover various modifications and similar arrangements as would be apparent to those skilled in the art. For example, the design of the invention may be used in both a transflective liquid crystal display and a micro-reflective liquid crystal display. Therefore, the scope of the appended claims should be accorded the broadest interpretation so as to encompass all such modifications and similar arrangements.

What is claimed is:
1. A multi-domain liquid crystal display, comprising:
a plurality of first picture elements and a plurality of second picture elements having opposite polarities under the same frame of an inversion drive scheme, each of the first and second picture elements having a reflective region and a transmissive region;
a plurality of first auxiliary electrodes connected to the first picture elements, each of the first auxiliary electrodes being positioned next to at least one side of one second picture element; and a plurality of second auxiliary electrodes connected to the second picture elements, each of the second auxiliary electrodes being positioned next to at least one side of one first picture element.

2. The multi-domain liquid crystal display as claimed in claim 1, wherein each transmissive region is at least partially surrounded by the auxiliary electrodes.

3. The multi-domain liquid crystal display as claimed in claim 1, wherein each reflective region is at least partially surrounded by the auxiliary electrodes.

4. The multi-domain liquid crystal display as claimed in claim 1, wherein the first and the second auxiliary electrodes are transparent electrodes or reflective electrodes.

5. The multi-domain liquid crystal display as claimed in claim 1, further comprising at least one slit formed between the reflective region and the transmissive region.

6. The multi-domain liquid crystal display as claimed in claim 5, wherein at least one auxiliary electrode extends into the slit.

7. The multi-domain liquid crystal display as claimed in claim 1, wherein each picture element is divided into multiple sub picture elements by slits provided on electrodes.

8. The multi-domain liquid crystal display as claimed in claim 1, wherein each picture element is divided into multiple sub picture elements by the auxiliary electrodes.

9. A multi-domain liquid crystal display, comprising:
a first and a second transparent substrates facing to each other;
a liquid crystal layer interposed between the first and the second transparent substrates;
a common electrode provided on the first transparent substrate;
a Metal 1 layer formed on the second transparent substrate;
a first dielectric layer formed on the second transparent substrate and covering the Metal 1 layer;
a Metal 2 layer formed on the first dielectric layer;
a second dielectric layer formed on the first dielectric layer and covering the Metal 2 layer;
a plurality of pixel electrodes and reflective electrodes formed on the second substrate; and
a plurality of auxiliary electrodes formed on the second transparent substrate, wherein each of the auxiliary electrodes is positioned next to at least one side of one pixel electrode or one reflective electrode, and the auxiliary electrodes have opposite polarities in relation to the pixel electrodes and the reflective electrodes so as to produce fringe fields.

10. The multi-domain liquid crystal display as claimed in claim 9, wherein the first dielectric layer is a gate insulation layer and the second dielectric layer is a flattened layer.

11. The multi-domain liquid crystal display as claimed in claim 9, wherein the first dielectric layer is a gate insulation layer and the second dielectric layer is a passivation layer.

12. The multi-domain liquid crystal display as claimed in claim 9, wherein the auxiliary electrodes are made from a Metal 1 layer, a Metal 2 layer, a Metal 3 layer, or transparent conductive films.

13. The multi-domain liquid crystal display as claimed in claim 9, wherein the reflective electrodes are made from a Metal 1 layer, a Metal 2 layer, or a Metal 3 layer.

14. The multi-domain liquid crystal display as claimed in claim 9, further comprising a plurality of common lines formed on the second dielectric layer and electrically connected to the common electrode.

15. The multi-domain liquid crystal display as claimed in claim 14, wherein the Metal 2 layer is patterned to define storage electrodes, and the common lines are made from the Metal 1 layer and overlap the storage electrodes to form storage capacitors.

16. The multi-domain liquid crystal display as claimed in claim 15, wherein the storage electrodes and the common lines are formed underneath the reflective electrodes.

17. The multi-domain liquid crystal display as claimed in claim 14, wherein the common lines are made from transparent conductive films and overlap the auxiliary electrodes to form storage capacitors, and the pixel electrodes are formed on the second dielectric layer.

18. The multi-domain liquid crystal display as claimed in claim 17, further comprising a third dielectric layer formed on the second dielectric layer and covering the common lines and the pixel electrodes, and the reflective electrodes and the auxiliary electrodes being formed on the third dielectric layer.

19. The multi-domain liquid crystal display as claimed in claim 17, wherein the Metal 2 layer is patterned to define a plurality of signal lines, and the common lines overlap the signal lines.

20. The multi-domain liquid crystal display as claimed in claim 14, wherein the common lines are made from the Metal 3 layer and overlap the auxiliary electrodes to form storage capacitors.

21. The multi-domain liquid crystal display as claimed in claim 20, further comprising a third dielectric layer formed on the second dielectric layer and covering the common lines and the reflective electrodes, and the pixel electrodes and the auxiliary electrodes being formed on the third dielectric layer.

22. The multi-domain liquid crystal display as claimed in claim 20, wherein the Metal 2 layer is patterned to define a plurality of signal lines, and the common lines overlap the signal lines.

* * * * *